United States Patent

Chandersekaran et al.

[19]

[11] Patent Number: 6,058,188
[45] Date of Patent: *May 2, 2000

[54] METHOD AND APPARATUS FOR INTEROPERABLE VALIDATION OF KEY RECOVERY INFORMATION IN A CRYPTOGRAPHIC SYSTEM

[75] Inventors: Coimbatore S. Chandersekaran, Potomac, Md.; Rosario Gennaro, New York, N.Y.; Sarbari Gupta, Rockville, Md.; Stephen M. Matyas, Jr., Manassas, Va.; David R. Safford, Brewster; Nevenko Zunic, Wappingers Falls, both of N.Y.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/899,855

[22] Filed: Jul. 24, 1997

[51] Int. Cl.[7] .................................................... H04L 9/32
[52] U.S. Cl. ............................................. 380/25; 380/30
[58] Field of Search ....................... 380/25, 21; 395/186, 395/187

[56] References Cited

U.S. PATENT DOCUMENTS

| | | |
|---|---|---|
| 4,200,770 | 4/1980 | Hellman et al. . |
| 5,276,737 | 1/1994 | Micali . |
| 5,315,658 | 5/1994 | Micali . |
| 5,557,765 | 9/1996 | Lipner et al. . |
| 5,579,393 | 11/1996 | Conner et al. ............................. 380/25 |
| 5,615,268 | 3/1997 | Bisbee et al. ............................. 380/25 |
| 5,661,803 | 8/1997 | Cordery et al. ............................ 380/21 |
| 5,664,017 | 9/1997 | Gressel et al. ............................. 380/30 |
| 5,815,573 | 9/1998 | Johnson et al. ............................ 380/21 |
| 5,825,880 | 10/1998 | Sudia et al. ............................... 380/21 |
| 5,841,865 | 11/1998 | Sudia ......................................... 380/21 |

OTHER PUBLICATIONS

"A Taxonomy for Key Escrow Encryption System", D. E. Denning et al., Communications of the ACM, vol. 39, No. 3, Mar. 1996, pp. 34–40.

(List continued on next page.)

*Primary Examiner*—Tod R. Swann
*Assistant Examiner*—Todd Jack
*Attorney, Agent, or Firm*—William A. Kinnaman Jr.

[57] ABSTRACT

In a cryptographic communications system, a method and apparatus for allowing a sender of encrypted data to demonstrate to a receiver its ability to correctly generate key recovery information that is transmitted along with the encrypted data and from which law enforcement agents or others may recover the original encryption key. Initially, the sender generates a key pair comprising a private signature key and a corresponding public verification key and sends the latter to a key recovery validation service (KRVS). Upon a satisfactory demonstration by the sender of its ability to correctly generate key recovery information, the KRVS generates a certificate certifying the public verification key and the ability of the sender to correctly generate key recovery information. The sender uses its private signature key to generate a digital signature on the key recovery information, which is sent along with the key recovery information and encrypted data to the receiver. The receiver verifies the signature on the key recovery information using the certified public verification key and decrypts the encrypted data only if the signature is verified as being a valid signature.

22 Claims, 9 Drawing Sheets

OTHER PUBLICATIONS

"Alternatives To RSA Using Diffie–Hellman With DSS", (1996), pub. at http:// www.cylink.com/products/security/rsa/rsa–dss2. htm.

*Applied Cryptography* (Second Edition 1996) Bruce Schneier, John Wiley & Sons, Inc., New York pp. 70–71.

"Binding Cryptography. A fraud–detectible alternative to key–escrow proposals", E. Verheul et at. (1996), published at http:// cwix.kub.nl/~frw/people/koops/binding.htm.

"Binding the ElGamal Encryption Scheme", E. Verheul et al., (1996), published at http://cwis.dub.nl/~frw/people/koops / bindtech.htm.

"New Directions in Cryptography", IEEE Transactions on Information Theory, vol. IT–22, No. 6, Nov. 1976, pp. 644–654.

Public Key Infrastructure "Binding Cryptography —A Fraud–Detectible Alternative to Key–Escrow Proposals" E. Verheul et al., Computer Law & Security Report, vol. 13, No. 1, 1997, pp. 3–14.

"To Tap of Not To Tap", D. Denning, Communications of the ACM, vol. 36, No. 3, Mar. 1993, pp. 26–33.

METHOD AND APPARATUS FOR INTEROPERABLE VALIDATION OF KEY RECOVERY INFORMATION IN A CRYPTOGRAPHIC SYSTEM

BACKGROUND OF THE INVENTION

1. Field of the Invention

This invention relates to a cryptographic key recovery system and, more particularly, to a method and apparatus for interoperable validation of the correctness of key recovery information within a cryptographic system.

2. Description of the Related Art

Data encryption systems are well known in the data processing art. In general, such systems operate by performing an encryption operation on a plaintext input block, using an encryption key, to produce a ciphertext output block. The receiver of an encrypted message performs a corresponding decryption operation, using a decryption key, to recover the plaintext block.

Encryption systems fall into two general categories. Symmetric (or private key) encryption systems such as the Data Encryption Standard (DES) system use the same secret key for both encrypting and decrypting messages. In the DES system, a key having 56 independently specifiable bits is used to convert 64-bit plaintext blocks to ciphertext blocks, or vice versa.

Asymmetric (or public key) encryption systems, on the other hand, use different keys that are not feasibly derivable from one another for encryption and decryption. A person wishing to receive messages generates a pair of corresponding encryption and decryption keys. The encryption key is made public, while the corresponding decryption key is kept secret. Anyone wishing to communicate with the receiver may encrypt a message using the receiver's public key. Only the receiver may decrypt the message, however, since only he has the private key. Perhaps the best-known asymmetric encryption system is the RSA encryption system, named after its originators Rivest, Shamir and Adleman.

Asymmetric encryption systems are generally more computationally intensive than symmetric encryption systems, but have the advantage that they do not require a secure channel for the transmission of encryption keys. For this reason, asymmetric encryption systems are often used for the one-time transport of highly sensitive data such as symmetric encryption keys.

Data encryption systems of all types have attracted the attention of government intelligence agencies and law enforcement agencies, since the same cryptographic strength that prevents decryption by unauthorized third parties also prevents decryption by intelligence or law enforcement officials having a legitimate reason for wanting to access the plaintext data. Because of such concerns, governments have either prohibited the use or export of strong encryption systems or have conditioned their approval on the use of weakened keys that are susceptible to key-exhaustion attacks (i.e., systematically testing all possible keys until the right one is found). Such weak encryption systems have the obvious disadvantage that they are just as vulnerable to unauthorized third parties as they are to authorized government officials.

Various cryptographic key recovery systems have recently been proposed as a compromise between the demands of communicating parties for privacy in electronic communications and the demands of law enforcement agencies for access to such communications when necessary to uncover crimes or threats to national security. Generally, in such key recovery systems, all or part of the key used by the communicating parties is made available to one or more key recovery agents, either by actually giving key related recovery information to the key recovery agents ahead of time, (in which case the recovery information is said to be "escrowed") or by providing sufficient information in the communication itself (as by encrypting the key portions) which the key recovery agents could obtain after the communication occurred. Key recovery agents would reveal the escrowed or regenerated key information to a requesting law enforcement agent only upon presentation of proper evidence of authority, such as a court order authorizing the interception. The use of multiple key recovery agents, all of which must cooperate to recover the key, minimizes the possibility that a law enforcement agent can improperly recover a key by using a corrupt key recovery agent.

Key recovery systems serve the communicants' interest in privacy, since their encryption system retains its full strength against third parties and does not have to be weakened to comply with domestic restrictions on encryption or to meet export requirements. At the same, key recovery systems serve the legitimate needs of law enforcement by permitting the interception of encrypted communications in circumstances where unencrypted communications have previously been intercepted (as where a court order has been obtained).

In addition to serving the needs of law enforcement, key recovery systems find application in purely private contexts. Thus, organizations may be concerned about employees using strong encryption of crucial files where keys are not recoverable. Loss of keys may result in loss of important stored data.

An important aspect of key recovery systems is the method used to ensure that correct recovery information is provided. If the recovery information provided is not correct, either through unintentional error, or deliberate attempt to corrupt, the functionality of the key recovery system can be thwarted. Validation can be provided in several ways, including direct checking by the participants, checking by the recovery agents, and checking by the recovery entity. Correctness can also be ensured by redundant calculation and disclosure of the recovery information by more than one of the communicating parties.

One of the problems with implementing cryptographic systems and the application programs that use the cryptographic systems is the large number of differing cryptographic methods and the rate of development of new methods. An important technique to simplify and standardize cryptographic support for applications is the concept of a software framework. A framework separates a given function into one part which is common across all specific methods, and multiple smaller modules which are specific to given methods. Different or new specific modules can replace or extend functionality, by "plugging" them into the framework, without having to update any applications.

To keep application writers from having to rewrite their code for each different cryptographic method and for every change in a given method, several cryptographic frameworks have been proposed, such as Microsoft's CAPI, and Intel's CDSA. The basic concept of the framework is to provide a consistent Application Programming Interface (API) to the application, under which the framework may plug any of a number of possible Cryptographic Service Provider (CSP) modules. These frameworks allow all application writers, and all writers of CSP methods to write to a common standard interface. The framework is designed to be very abstract and generic, so that any CSP representing possibly new cryptographic methods can be accommodated in the future, without having to update the applications using the framework.

It is possible to add key recovery functionality to an application that uses a cryptographic framework, by modifying the framework to support the adding of Key Recovery Service Provider (KRSP) modules. Just as the CSP would provide encryption and key exchange services to the application in a transparent, flexible manner, a KRSP would transparently enable the key recovery functionality, by creating the necessary key recovery information for a given key. The framework would place the key recovery information into the cryptographic data, so that actual key recovery (at some later time) would be enabled.

More generally, the framework would place the key recovery information into the "appropriate place" wherever that might be. It might be integrated into the transmitted or stored data, it might be integrated into key transport or key agreement protocol, it might be stored in a separate escrow file. It might be sent over a completely different channel, e.g., to a node that maybe just tosses it away.

In a similar manner, an application which provides the key recovery service (based on the key recovery information embedded by the enabling framework), may itself be layered on top of a Key recovery Service framework. A Key Recovery Service Service Provider (KRSSP) would plug into the framework, and perform actual key recovery calculations on a given set of key recovery data.

Key recovery systems of various types are described in D. E. Denning and D. K. Branstad, "A Taxonomy for Key Escrow Encryption Systems", *Communications of the ACM*, vol. 39, no. Mar. 3, 1996, pp. 34–40, incorporated herein by reference. Several specific key recovery systems are noted below.

Micali et al. U.S. Pat. No. 5,276,737 ("Micali I") and U.S. Pat. No. 5,315,658 ("Micali II") describe a "fair" public key cryptosystem in which the private key of a public/private key pair is broken into "shares" that are given to "trustees". The "breaking" is done in such a manner that: (1) the shares of all trustees (or a predetermined quorum) are required to reconstruct the key; and (2) each trustee can individually verify the correctness of his share. When all the trustees have certified the correctness of their share, the user's public key (corresponding to the escrowed private key) is certified by a key management center. Upon a predetermined request, the trustees provide their shares to a law enforcement agent or other recovering entity, who then reconstructs the private key from the shares and, with the private key, is able to monitor communications to the user. In this key recovery system, verification is done by the key management center and the trustees. This method of verification is undesirable, in that it requires prior communications with the trustees and key management center.

In another key recovery system, described in U.S. Pat. No. 5,557,346 to Lipner et al., the sender splits a session key into first and second session key portions by setting the first session key portion equal to a random number and setting the second session key portion equal to the XOR product of the random number and the session key. The sender creates a law enforcement access field (LEAF) by encrypting the respective session key portions with the public encryption keys of first and second key recovery agents and concatenating the two encryption products. The sender also creates a LEAF verification string (LVS) by concatenating the original session key portions and encrypts this using the session key to form an encrypted LEAF verification string (ELVS). Finally, the sender transmits an encrypted message, together with the LEAF and ELVS, to the receiver.

Before decrypting the encrypted message, the receiver regenerates the LEAF to verify that the sender has created a proper LEAF that would actually permit recovery of the session key through the key recovery agents. This is done by decrypting the ELVS to obtain the session key portions and then encrypting the respective session key portions with the public encryption keys of first and second key recovery agents. If the receiver succeeds in regenerating the transmitted LEAF in this manner, it concludes that the LEAF is genuine and proceeds to decrypt the message. Otherwise, it concludes that the LEAF is corrupt and does not proceed with the decryption step.

In this key recovery system, the verification of key recovery information is done by the receiver, which does avoid communication with the trustees or key management center. It does however require several public key encryption and decryption operations for every communication session, which is expensive in terms of computation and message size.

The copending application of R. Gennaro et al., Ser. No. 08/725,102, filed Oct. 2, 1996, and entitled "Two- Phase Cryptographic Key Recovery System", describes an alternative method of key recovery, called SKR, which permits a portion of the key recovery information to be generated once and then used for multiple encrypted data communications sessions and encrypted file applications. In particular, the mentioned portion of the key recovery information that is generated just once is the portion that requires public key encryption operations. Hence, SKR provides a way of reducing the costly public key encryption operations required of other key recovery methods.

The Gennaro et al. application also describes a verification mode in which the communicating parties Alice and Bob each produce SKR recovery blocks independently, without checking the other's so produced blocks. In this mode, if at least one side is correctly configured, all required recovery information is correctly produced. In addition, both Alice and Bob are free to include any optional recovery fields without causing a false invalidation of what the other sent. One limitation of this verification mode, however, is that it is not always convenient to establish bidirectional data connections, so this method of verification may be undesirable for some applications, such as store and forward electronic mail.

The SKR method of key recovery and verification described in the Gennaro et al. application is computationally efficient, as it provides for extensive caching of the recovery information, and requires no explicit verification. Its principal disadvantages are: (1) that it does not provide verification for non-interactive communications without requiring the receiver to perform public key operations; and (2) that it requires the transmission of additional secret information to Bob to allow him to perform verification, increasing the size of required communications.

The recent paper of E. Verheul, B.-J. Koops and H. C. A. van Tilborg entitled "Binding Cryptography: A Fraud-Detectible Alternative to Key-Escrow Proposals" (1996), published at http://cwis.kub.nl/~frw/people/koops/binding.htm, and the paper of E. Verheul and H. C. A. van Tilborg entitled "Binding the ElGamal Encryption Scheme" (1996), published at http://cwis.kub.nl/~frw/people/koops/bindtech.htm, present an alternative for verification of key recovery information. The papers describe a method in which a disinterested observer can verify that something encrypted under a receiver's public key is the same as something encrypted under an agent's public key. If the "something" is a session key or part of a session key, as is the case in key recovery fields, the observer can use this to validate the encrypted recovery data. Unlike the previous methods of verification, however, this method provides no way for the observer to verify that the encrypted fields actually contain correct information; instead, the observer only verifies that the encryptions contain the same secret.

Still other methods of verifiably providing key recovery use variants of the Diffie-Hellman (DH) key agreement protocol. By way of background, the Diffie-Hellman key agreement protocol is a procedure whereby two parties may establish a shared secret value (from which a symmetric encryption key may be derived) by exchanging only public values over a communications channel. The protocol was originally described at page 649 of W. Diffie and M. E. Hellman, "New Directions in Cryptography", *IEEE Transactions on Information Theory,* vol. IT-22, no. 6, November 1976, pp. 644–654, and in U.S. Pat. No. 4,200,770, both incorporated herein by reference.

In the two-party interactive form of the protocol, each party generates (e.g., pseudorandomly) a secret value x which it keeps to itself. Each party then generates a public value $$y = g^x \bmod p$$

where x is the secret value of that party, p is a prime modulus and g is a generator over the Galois field GF(p), and transmits the public value to the other party. Thereafter, each party generates a shared secret value $$z = y^x \bmod p$$

where x is its own secret value, y is the public value received from the other party, and p is defined as above. By virtue of the properties of modulo arithmetic, the shared secret values z generated by the two parties are the same.

The parties may derive a symmetric encryption key directly from the shared secret value z, as by extracting the required number of bits. Alternatively, the parties may perform a further operation on the shared secret value such as concatenating it with another value and hashing the concatenation result, as described in the copending application of S. M. Matyas et al., Ser. No. 08/736,774, filed Oct. 25, 1996, entitled "Method and Apparatus for Establishing an Authenticated Shared Secret Value Between a Pair of Users", incorporated herein by reference.

The security of this procedure relies on the apparent fact that, for appropriate choices of p and g, it is computationally infeasible to obtain either the secret values x or the shared value z from the public values y exchanged between the parties. Although exponentiation over a finite field was used in the above example, in general any suitable functions y(x) and z(x,y) may be used that have the commutative property $$z(x_1, y(x_2)) = z(x_2, y(x_1))$$

for any $x_1$ and $x_2$ and have the noninvertibility property mentioned above.

One such method of verifiably providing key recovery based on establishing a shared common Diffie-Hellman key was proposed by Dorothy E. Denning in "To Tap or Not to Tap", Communications of the ACM, vol. 36, no. 3, March 1993, pp. 26–33. In this paper she proposed an escrow system based on a three-party variation of Diffie-Hellman described in section 22.1 of B.

Schneier, *Applied Cryptography* (2d ed. 1996) as well as in the original Diffie et al. (1976) article cited above. In this method of key recovery, the verification of the recovery information can be inherent in the receiver's decryption of the information encrypted under the shared session key k.

The system proposed by Denning works as follows: Let Alice be the sender, Bob be the receiver, and Ted the trustee in order around the three-party circle. Let their respective secret parts be x, y, and z. In the first round, Alice sends to Bob $g^x$ mod p, Bob sends to Ted $g^y$ mod p, and Ted sends to Alice $g^z$ mod p. In the second round, Alice sends to Bob $g^{zx}$ mod p, Bob sends to Ted $g^{xy}$ mod p, and Ted sends to Alice $g^{yz}$ mod p. From these values, everyone can calculate $k = g^{xyz}$. If Alice sends something to Bob encrypted with k, Bob knows that Ted can calculate k and decrypt it also. (If Alice is dishonest, and does not want Ted to be able to calculate k correctly she could send an incorrect value of $g^{zx}$ mod p to Bob, and Bob would be unable to detect the error. This can be fixed by having Bob verify this value directly with Ted as an additional exchange of messages after the second round.)

This method has the advantage of being able to send encrypted recovery information to both Bob and Ted with a single encrypted field, thus reducing the size of data and the number of calculations. However, this method has the disadvantage of requiring communication with the trustee prior to transmission of the message to the receiver.

In a paper entitled "Alternatives to RSA Using Diffie-Hellman with DSS" (1996), published at http://www.cylink.com/products/security/rsa/rsa-dss2.htm, Cylink Corporation proposed a method similar to Denning's, but not requiring interactive communication with the trustee. Using the same example, let Alice be the sender, Bob be the receiver, and Ted be the trustee, and let their respective secret parts be x, y, and z.

Prior to any communication, Ted calculates a shared Diffie-Hellman key v with Alice based on Alice's public key ($g^x$ mod p), and his private key z, as follows:

$$u = g^{xz} \bmod p$$

$$v = g^u \bmod p$$

Ted publishes v as a public key shared between Alice and him. For communication with Bob, Alice can calculate a key k as:

$$k = g^{yv} \bmod p$$

Both Bob and Ted can calculate k, so if Alice sends something to Bob encrypted with k, she knows that Ted can also read it. In addition, Bob can verify this escrow, as he knows that Ted published the shared key v, and Ted can therefore calculate k. However, the disadvantage of this method is that it requires Alice to obtain a published shared key from Ted prior to communication with Bob.

The copending application of R. Gennaro et al., Ser. No. 08/775,348, filed Jan. 3, 1997, entitled "Method and Apparatus for Verifiably Providing Key Recovery in a Cryptographic System", presents a method of verification of key recovery information within a key recovery system, based on a variation of the three-party Diffie-Hellman key agreement procedure. Without communication with a trustee, the sender is able to encrypt recovery information in such a way that both the receiver and the respective trustee can decrypt it. This reduces the number of encryptions, and inherently validates the recovery information when the receiver decrypts it. The method is compatible with interactive and non-interactive communication. In the non-interactive case, the parties all use long term, certified, public keys, which precludes perfect forward secrecy. In the interactive case, the sender and receiver can use authenticated ephemeral keys, which preserves perfect forward secrecy. The method allows full caching of all public key operations, thus further reducing computational overhead.

Note that while Diffie-Hellman is used to describe this method, any public key method with commutative common key agreement properties may be used. While RSA does not have this property, versions of elliptic curve encryption do have this property, and can directly use this method for deriving shared keys.

For the simplified description of the design, consider the case in which Alice is sending an encrypted message to Bob, and wants to provide key recovery information that can be read by Ted. (A more detailed design, handling multiple parties and agents will be provided below.) Let Alice, Bob and Ted have the respective DH keypairs $\{x, g^x \bmod p\}$, $\{y, g^y \bmod p\}$, $\{a, g^a \bmod p\}$, where the public components ($g^x \bmod p$, $g^y \bmod p$, $g^a \bmod p$) are known to all parties.

At any time, both Alice and Bob can calculate the following:

$u=g^{xy} \bmod p$ (their common key)

$\{u, g^u\} \bmod p$ (a new DH keypair shared between Alice and Bob)

$v=g^{au} \bmod p$ (a new common key between Alice-Bob and Ted)

Alice then picks a session key K which will be used to encrypt the message, and sends to Bob:

v(K)
$g^u$
K(message)

where the expression v(K), for example, indicates symmetric encryption of K under the key v.

The first part includes the symmetric encryption under v of K. This field can be decrypted by Bob, who can calculate v from Ted's public key $g^a$, and u. Ted can also decrypt the field, based on the included $g^u$ in the message, and his secret a. Thus the field v(K) serves both as secure transmission of K to Bob and as recovery information for Ted.

Note that all expensive public key calculations (the exponentiations) depend only on the secret values x, y, and a (for Alice, Bob, and Ted respectively). These values may be as long lived or as short lived as desired, trading off computation expense for greater security. In the non-interactive case, the values will typically be long lived, with the public components distributed as certificates. In this case there is no perfect forward secrecy, but all exponentiations are constant, and therefore need only be calculated once, and the results saved, providing significant reduction in computational overhead. In the interactive case, if perfect forward secrecy is desired, Alice and Bob can exchange ephemeral DH keys. This provides greater security, at the expense of having to perform all of the exponentiations for each session. In the interactive case, new values may be calculated at any desired frequency.

In all cases, it is assumed that the obtained Diffie-Hellman public keys have been validated (i.e., authenticated as actually originating from the person purporting to be the owner).

Long-lived keys will typically be distributed as certificates whose signatures can be validated. In the case of ephemeral Diffie-Hellman keys, it is assumed that the ephemeral key exchange has been signed by certified keys in some way. The exact method of validation of these ephemeral keys is application dependent. One such method is described in the copending application of S. M. Matyas et al., Ser. No.08/736,774, referred to above.

The latter copending Gennaro et al. application of provides several desirable features. It provides the ability to cache all public key operations, and can be used in the interactive and non-interactive cases. It serves as a vehicle for transmission both to Bob and to the recovery agent, saving encryptions. Since it uses only published public keys, no additional keys need be exchanged. It can preserve perfect forward secrecy in the interactive case, if Alice and Bob exchange ephemeral $g^x$ and $g^y$ for every new session. Finally, it preserves the verification by both Alice and Bob: if Alice is honest, she correctly uses the agent's $g^a$; if Bob is honest, he inherently verifies that v is correctly based on $g^a$.

The preceding verification methods all assume that the verifying party is able to interpret and verify the recovery information. There are many different key recovery algorithms, each producing a key recovery block (KRB) composed of different information using a uniquely different block format, including those described above, and it may be impractical for a receiver to be able to verify all of the possible formats. What is needed is an interoperable validation scheme in which a receiver may more easily establish some level of trust in the supplied recovery information.

Interoperable validation methods have several desirable properties. The validation method must support interoperability between all key recovery methods. The validation method should not require communication during message creation and transmission. The validation method should minimize the required computations, and transmission overhead associated with the validation.

If the receiver is unable to verify a given KRB directly, the next best approach is to validate the sender's cryptographic framework. For example, the sender could attempt to prove that it is a valid IBM framework implementation. The receiver could accept such proof as evidence that the given KRB must be correct.

One approach to providing such a proof would be for the sending framework code to sign the KRB with a private key known only to a "good" implementation. The receiver could verify the signature with the corresponding public key certificate. However, there are several potential problems with this signature approach.

First, the private key needs to be made available to the framework code in some way. If a single private key is used for all copies shipped, and if this private key is ever extracted from the code, then all copies would be compromised. If each copy shipped is given a different private key, then there is the difficulty of branding each copy (quite difficult with CD-ROMs), and also the difficulty of setting up the associated certificate authority (CA) service, so that the receiver can verify a signature's corresponding public key.

Second, software-only solutions cannot securely hide a private key; it is only a matter of time until someone posts a tool for extracting a given key in such a system. If the private keys are exposed, then bad senders could easily impersonate a good sender, while providing bogus key recovery information.

SUMMARY OF THE INVENTION

The present invention contemplates an interoperable validated capability signature (IVCS) as a variation of signature-based KRB validation that addresses these issues and offers some additional benefits. In this scheme, framework implementations are shipped without built-in or pre-established validating private keys. At installation, and possibly periodically thereafter, the framework communicates with a key recovery validation service (KRVS). In this communication, the framework demonstrates the capability to create a given type of KRB correctly, and in exchange the KRVS certifies the framework's proposed (randomly selected) public key. In this scheme, the sender framework would send the certified public key to the receiver, which could validate it with the known public key of the KRVS.

This scheme avoids the problem of branding keys into a CD-ROM distribution, while providing each copy with a unique key. The KRSV can give each certificate a limited lifetime, so even if a key can be extracted from a copy, the extracted key will be of limited lifetime.

The present invention has several advantages. It provides separate validation private keys for each installed copy of the software. By obtaining these keys after installation, the difficulty of branding CD-ROMs is avoided. Since the validation public keys are obtained on-line, they may be given limited lifetimes, and new keys obtained when existing ones expire. Such limited lifetimes would greatly complicate any attempts to forge these credentials. Also, the validation keys can be tied to host-specific information, such as hostname or IP address. This also greatly complicates attempts to forge valid certificates.

The preferred embodiment performs the expensive signature validation one time, and then reuses a shared secret for fast message authentication code (MAC)-based validation on subsequent communications.

The present invention provides interoperability between different key recovery implementations, as validation is independent of knowledge of the internals of a given key recovery method. It also provides interoperability between key recovery and non-key recovery systems. A given receiver framework need not have any key recovery service provider modules to validate a KRB.

The validation system of the present invention can be performed by any observer, such as law enforcement, without revealing any key related information. With other systems based on receiver validation, such as the schemes described in the Lipner et al. patents referred to above, law enforcement cannot tell if a given recovery field is valid without performing recovery through the respective recovery agent. With the present invention, law enforcement can verify the signatures directly.

The validation system of the present invention does not verify the recoverability of every key, but rather validates the framework, and then trusts the framework to perform the key recovery enablement correctly. The present invention does require at least one communication with a validation service prior to communication. This is still highly scalable, however, as only a single communication is required (not one for every communication or recipient), and any number of replicated validation servers may be used.

With the present invention, the recovery framework must be key recovery aware. It does not require any actual key recovery modules, and need not perform key recovery enablement, but it does need to perform the interoperable validation.

DESCRIPTION OF THE PREFERRED EMBODIMENT

Figure 1:
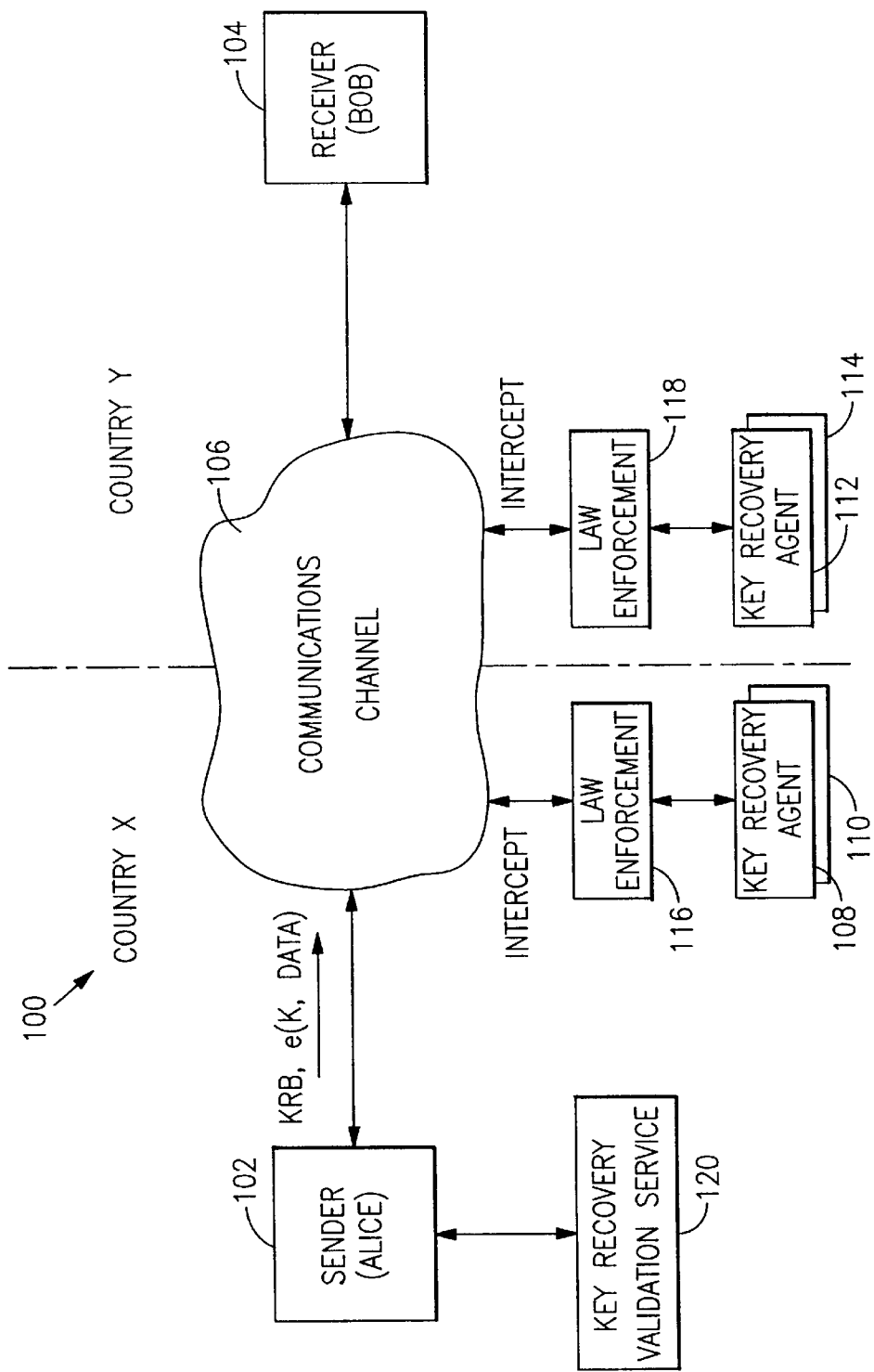
FIG. 1 shows a cryptographic communications system incorporating the present invention.

FIG. 1 shows a communication system 100 in which the present key recovery system may be used. In system 100, a sender 102 ("Alice") in country X communicates with a receiver 104 ("Bob") in country Y by transmitting encrypted data comprising one or more messages (making up a communications session or electronic mail application) or one or more files (making up a file transfer application) over a communications channel 106. The transmitted messages are encrypted by the sender 102 using a data encryption key (referred to herein as a session key) and decrypted by the receiver 104 using a corresponding data decryption key. The data decryption key is the key being recovered and is the same as the encryption key if a symmetric encryption procedure such as DES is used. Sender 102 and receiver 104 may each comprise computer workstations, suitably programmed (using program storage devices such as magnetic, optical or semiconductor media containing programs of instructions thereon) to provide the encryption and key recovery functions described below. Although the example of FIG. 1 assumes that the sender 102 and receiver 104 are located in different countries (X and Y), the invention may also be used entirely within a single country.

A pair (in this particular example) of key recovery agents, or trustees, 108 and 110 are selected in country X, while a pair of key recovery agents 112 and 114 are selected in country Y. It is contemplated that the establishment of key recovery agents could take place as part of the establishment of a general public key infrastructure. Communications over communication channel 106 are assumed to be subject to interception by third parties, including respective law enforcement agents 116 and 118 in countries X and Y. Non-governmental third parties intercepting the encrypted communications will be unable to decipher the communications unless they successfully use one or more cryptanalytic techniques. On the other hand, a law enforcement agent 116 or 118 having proper authority will be able to recover an SKR-protected key, using the key recovery agents 108, 110 or 112, 114 for his country as described below, and the sender (Alice) or receiver (Bob) will also be able to recovery an SKR-protected key using a similar procedure.

Although workstations 102 and 104 are identified as the sender and receiver, respectively, either workstation would in practice operate both as a sender and receiver and would incorporate functions that are appropriate for these roles.

In accordance with the present invention, sender 102 interacts with a key recovery validation service (KRVS) 120 to obtain a certificate certifying both its public signature verification key and its capability of correctly forming key recovery blocks (KRBs), as described in more detail below. KRVS 120, also referred to herein as an ICVS server, functions as a certificate authority (CA), affixing its own digital signature to a certificate. However, KRVS differs from conventional CAs in that it certifies not only a public key, but also a key recovery capability of the sender 102. Although not shown in FIG. 1, workstation 104 would also interact with a KRVS (possibly the same KRVS 120 that interacts with workstation 102) to support its operation as a sender.

Figure 2:
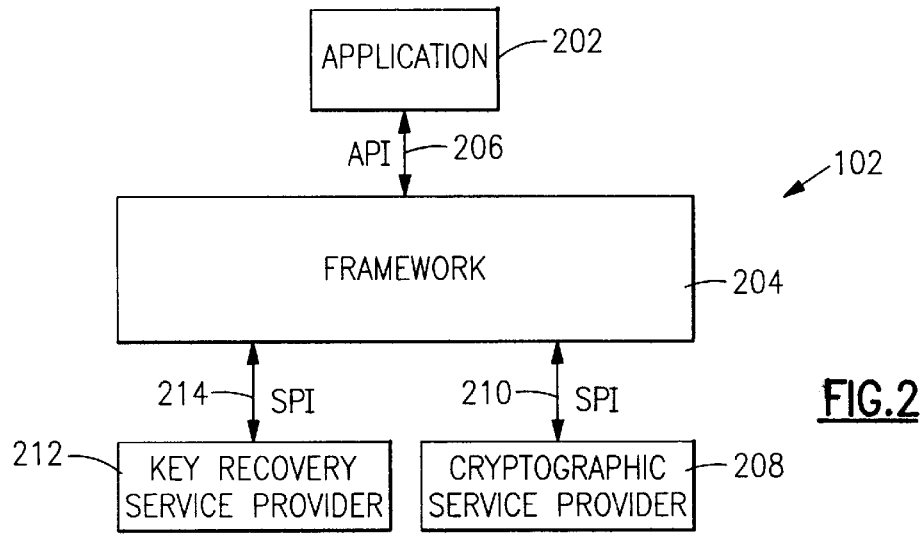
FIG. 2 shows the programming interfaces of the workstation of one of the communicating parties shown in FIG. 1.

FIG. 2 shows the software components of the sender workstation 102 that are relevant to the present invention. (The corresponding components of the receiver workstation 104 may be identical but are is not shown.) As noted above, and in the context of this specification, a "framework" is a layer of abstraction that isolates application code that requires a set of services from the modules that actually implement the services. The application deals with an abstract application programming interface (API), while the service providers (SPs) conform to abstract service provider interfaces (SPIs). Examples of cryptographic frameworks include the Microsoft and Intel implementations referred to above as well as the IBM® SecureWay® Key Management Framework (SKMF), described in the white paper entitled "IBM SecureWay Key Recovery Framework and Key Recovery Technology", at http://www.ibm.com/Security/html/wp_keymgt.html, incorporated by reference herein.

As shown in FIG. 2, one or more applications 202 interact with a framework 204 via an API 206. Framework 204 in turn interacts with one or more service providers (SPs) 208, 212 via SPIs 210, 214. In the particular example shown, the service providers include one or more cryptographic service providers (CSPs) 208 interacting with framework 204 via a cryptographic SPI and, optionally, one or more key recovery service providers (KRSPs) 212 interacting with framework 204 via a key recovery SPI (KR-SPI) 214. The KRSP 212 of a particular workstation 102 or 104 need not be compatible with the KRSP of the other workstation, nor does a workstation necessarily have a KRSP. Indeed, a principal objective of the present invention is the interoperability of workstations having different or possibly no KRSPs 212. Framework 204 is the entity that "represents" the workstation 102 or 104 and communicates with the KRVS 120 to have its key recovery capability (i.e., that of its KRSP(s) 212) certified in accordance with the present invention.

In the proposed IVCS system, a recovery framework 204 wishing to be validated would establish a connection to an IVCS server 120, using a secure (encrypted) session protocol, such as SSL. The secure session protocol would authenticate the server 120 and exchange a session key K, which would be used for data encryption. Once the session key is established, all further communication would be encrypted. The client framework 204 would then generate a valid KRB with respect to session key K, and would generate a proposed public/private key pair to be certified. The client framework 204 would send the KRB and candidate public key to the server 120, which would validate the submitted KRB for correctness, and if correct, would sign the candidate public key certificate.

The validation data flow can be summarized as:

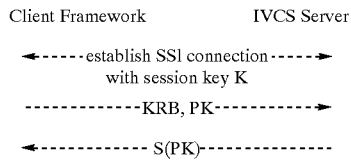

where KRB is the key recovery block for key K, PK is the client's candidate public key, and S(PK) is a signature of PK under the server's key.

Figure 3:
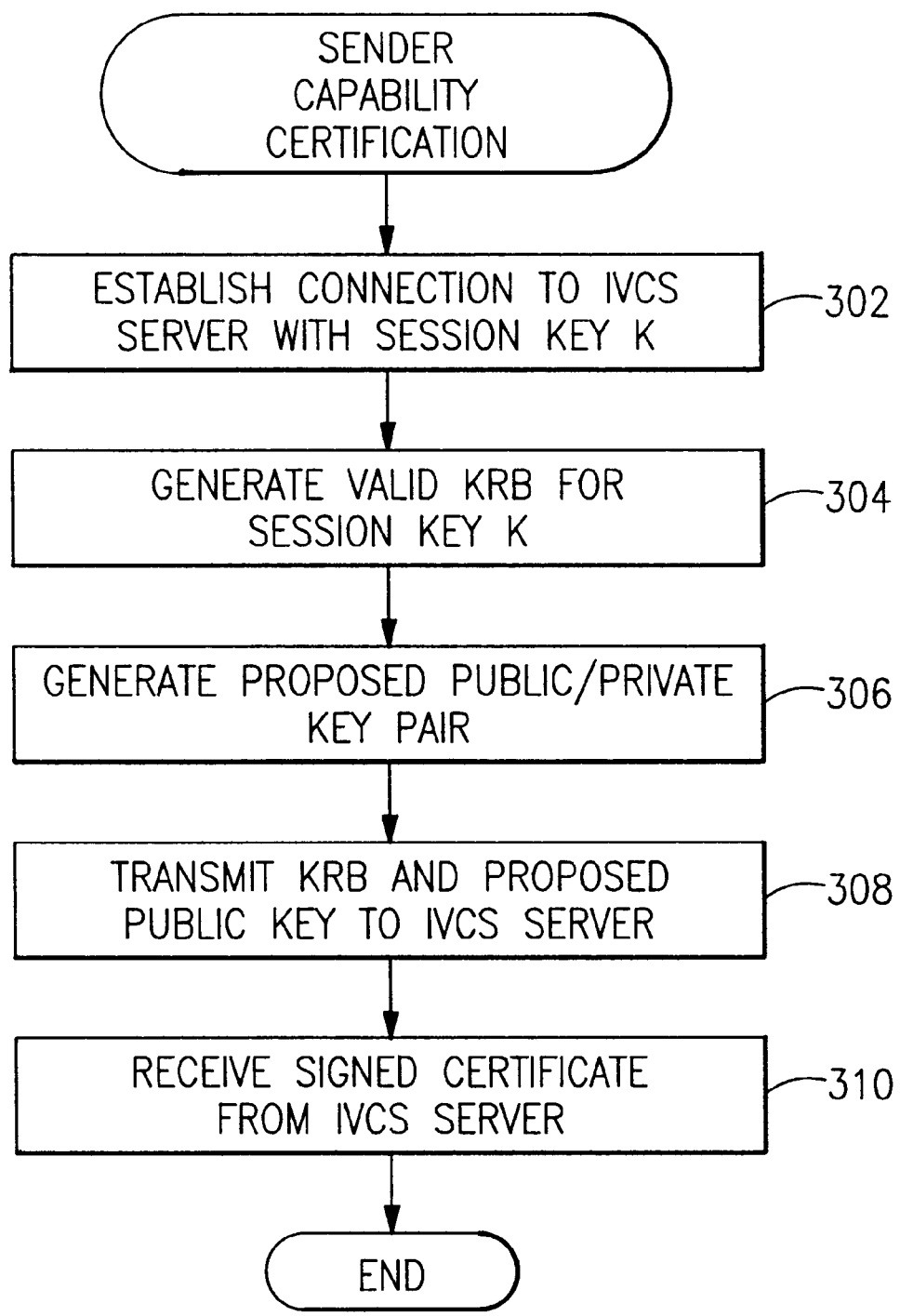
FIG. 3 shows the procedure followed by the sender to certify its capability.
Figure 4:
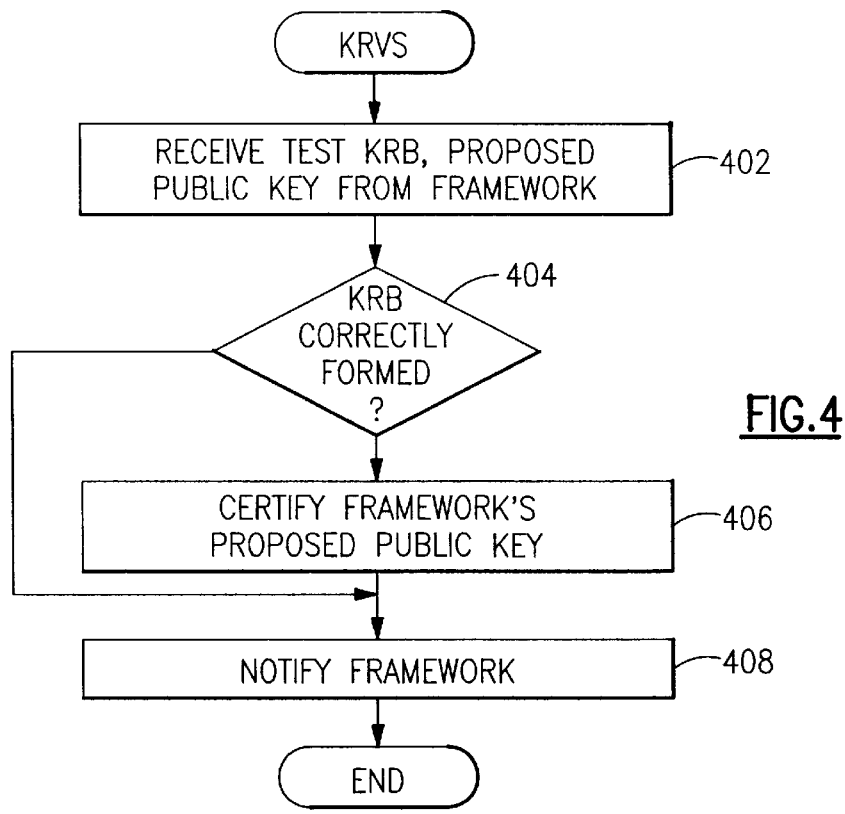
FIG. 4 shows the procedure followed by the key recovery service to certify the capability of the sender.

FIGS. 3–4 show the certification procedure in flowchart form. FIG. 3 shows the steps performed by a client framework 204, while FIG. 4 shows the steps performed by the ICVS server 120. Referring first to FIG. 3, the client framework 204 initially establishes a connection to the ICVS server 120 with a session key K (step 302). Next, the client framework 204 generates a valid KRB for the session key K (step 304) and generates a proposed public/private key pair (step 306). (Alternatively, the key pair could be generated by the ICVS server 120 and transmitted securely to the requesting framework 204.) The client framework 204 then transmits the KRB and the public key of the pair to the ICVS server 120 (step 308), which then performs the steps shown in FIG. 4. If the procedure is successful, the client framework 204 receives a certificate from the ICVS server 120 attesting the framework's ability to correctly form a KRB (step 310); this certificate is stored for later use in forming KRBs, as described below.

Referring to FIG. 4, upon receiving the test KRB and the proposed public key from the framework 204 (step 402), the ICVS server 120 tests the KRB to determine whether it is properly formed (step 404). If it is, then the ICVS server 120 issues a certificate attesting the capability of the client framework 104 to correctly form a KRB (step 406) Finally, the ICVS server 120 transmits a response to the client framework 204 notifying it of the results of the request (step 408). Such a notification would contain either the certificate if it was granted or the reason for failure if it was not.

Figure 16:
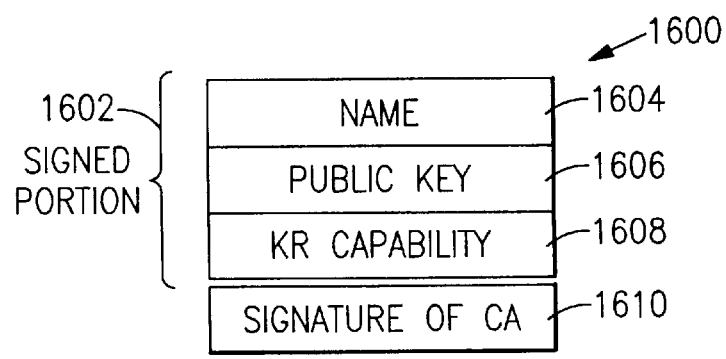
FIG. 16 shows the general format of a certificate.

FIG. 16 shows the general format of a certificate 1600 issued by the ICVS server 120. As is conventional, the certificate 1600 would contain a signed portion 1602 together with an appended signature 1610 of the certification authority (in this case the server 120). The signed portion 1602 of the certificate would specify not only the name 1604 and public key 1606 of the user (in this case the client framework 204), but also a particular key recovery capability 1608, so that the certificate 1606 would in effect say: "User A has public key PK and key recovery capability KR", where A is the user name 1604, PK is the public (verification) key 1606, and KR is the key recovery capability 1608.

The proposed signature-based system can be combined with direct KRSP verification and Message Authentication (MAC) based on an established secret key, or session key, to provide greater flexibility and reduced overhead. The first time two parties communicate, the given KRB could be validated directly by the receiver's KRSP 212, if they have KRSP modules with the same method, or by the present IVCS signature scheme. The sender and receiver could then create a shared validation secret from a hash of the session key. This shared secret would be used in computation of a MAC to authenticate and verify integrity of the supplied KRB for this and all subsequent KRB exchanges.

Figure 7:
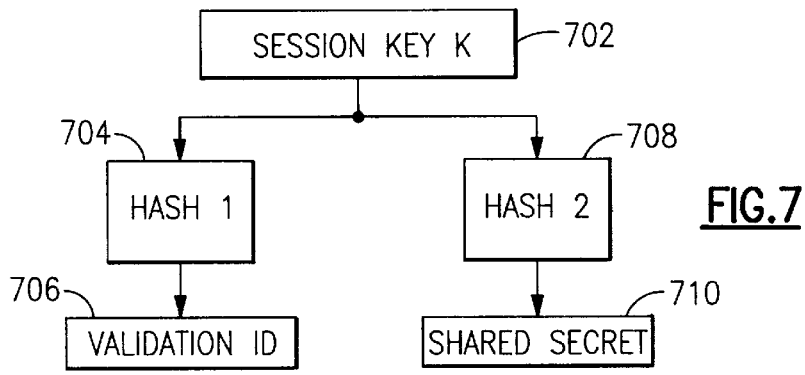
FIG. 7 shows the derivation of a validation ID and corresponding shared secret by the communicating parties.

FIG. 7 shows the general data flow involved in the generation of a validation ID and corresponding shared secret. As shown in the figure, session key K (702) is passed through a first hash function (Hash1) 704 to generate a validation ID 706 and through a second hash function (Hash2) 708, different from the first function 704, to generate a shared secret 710. The secret 710 is shared between the sender 102 and the receiver 104 because each of them perform the same derivation steps to generate the secret 710 from their original shared secret, the session key 702. (The receiver 104 does not replicate the procedure for deriving the validation ID 706, but receives this from the sender.) In practice, different hashes of the same session key 702 would be generated by incrementing a counter or the like that is concatenated or otherwise combined with the key before hashing.

Figure 8:
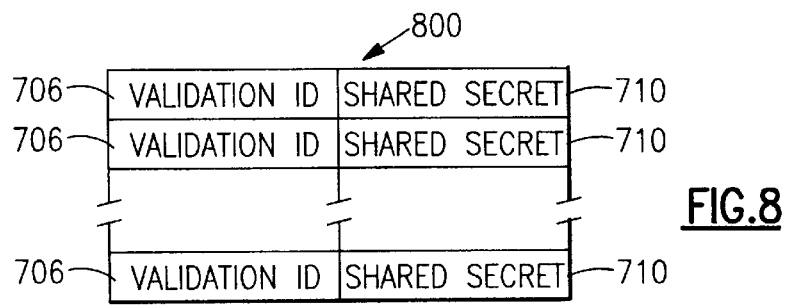
FIG. 8 shows the shared secret table managed by each communicating party.

Referring to FIG. 8, the parties 102 and 104 would keep pairs of corresponding validation IDs 706 and shared secrets 710 in a table 800 in storage so that the shared secret corresponding to a given validation ID may be readily retrieved.

In an interoperable key recovery system, there could be two phases to the establishment of a session. In the first phase (phase 1), the parties could negotiate whether or not key recovery was needed, and if needed, which KRSP 212 to use. If a common KRSP 212 is available, it could be used, so that the receiver's KRSP could do direct validation of the KRB. If not the sender could supply a public key certificate which the sender could use for signature based validation. In the second phase (phase 2), the actual authentication and key recovery information would be sent.

In phase 1, which could occur off-line, the parties 102 and 104 would negotiate two items: first, whether or not key recovery was needed, and second, if needed, which form of key recovery to use. In this system it is envisioned that all frameworks 204 could be key recovery aware, but not all instances would have KRSP modules 212, and only frameworks shipped overseas would be branded to require key recovery. Thus a domestic copy of a framework 204 would not have to perform key recovery if communicating with another domestic copy, but it could receive and validate key recovery enabled communication from an overseas copy, even with no local KRSP 212.

Figure 5:
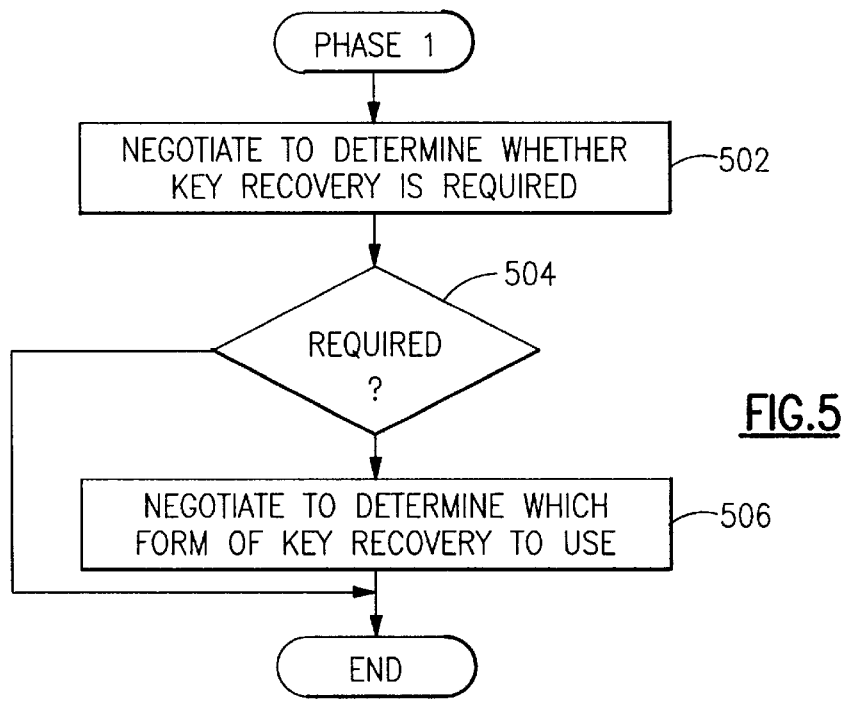
FIG. 5 shows the phase 1 procedure followed by the communicating parties.

FIG. 5 shows the steps performed by the sender 102 and receiver 104 during phase 1. The parties 102 and 104 first negotiate with each other to determine whether key recovery is required (step 502); this would depend on, among other things, the physical location of the communicating parties (i.e., whether either party was in a jurisdiction requiring recovery). If key recovery is required (step 504), then the parties 102 and 104 negotiate with each other to determine which form of key recovery to use (step 506); this would depend on, among other things, the particular KRSPs 212 of the communicating parties.

In phase 2, the sender 102 encrypts data under a session key K to generate encrypted data e(K, data), generates a key recovery block KRB from which the session key K can be recovered, and transmits e(K, data) and KRB to the receiver 104.

Figure 9:
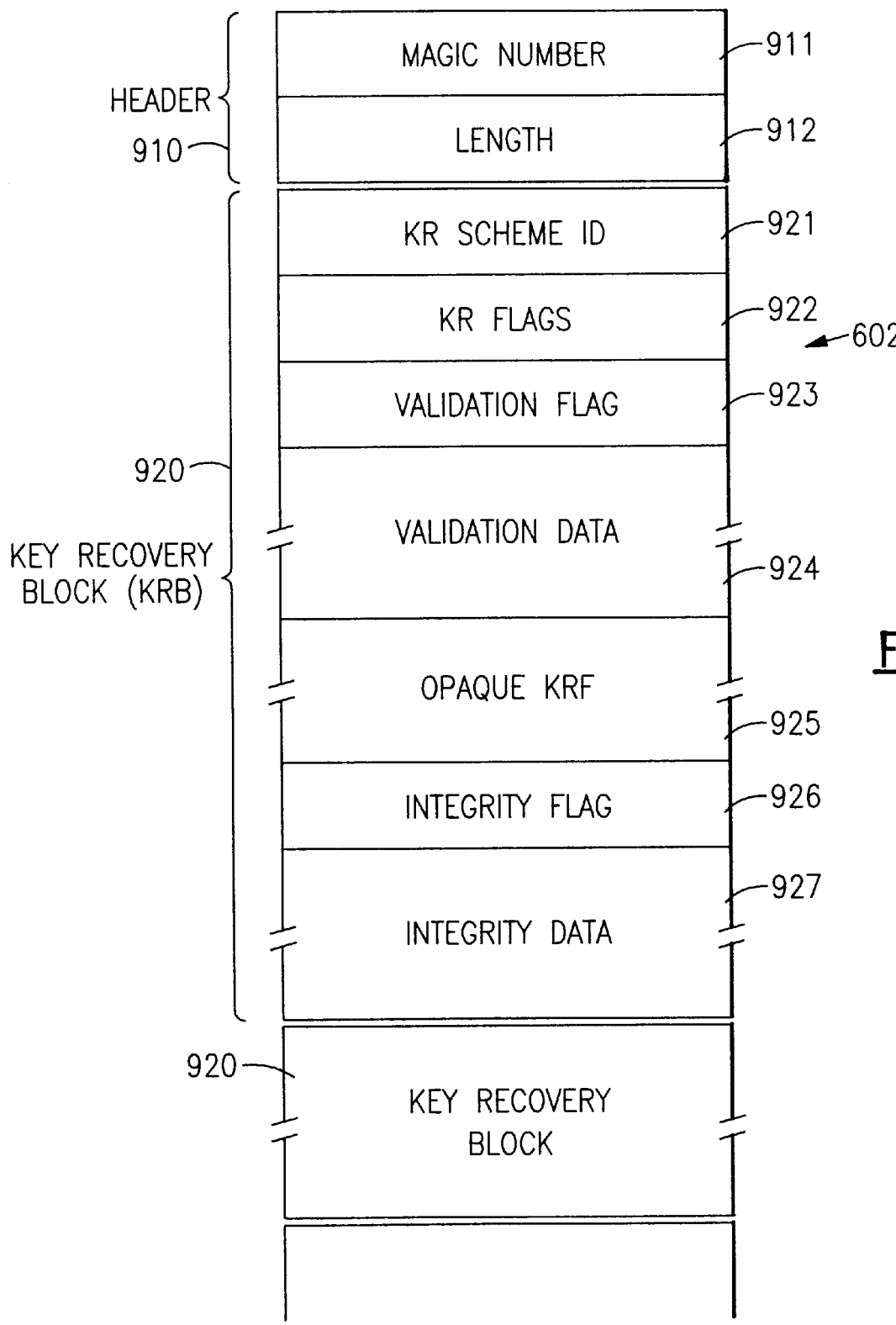
FIG. 9 shows the format of a typical key recovery block.

FIG. 9 shows one possible format of the key recovery data 602, which comprises a key recovery header 910 followed by one or more key recovery blocks (KRBs) 920. The format shown is only exemplary, and the fields may be arranged differently if desired. As shown in the figure, header 910 contains the following fields 911–912:

| Field | Length | Description |
| --- | --- | --- |
| Magic Number (911) | 4 bytes | Unique identifier for IVCS format |
| Length (921) | 4 bytes | length of all following KRBs | while each KRB 920 contains the following fields 921–927:

| Field | Length | Description |
| --- | --- | --- |
| KR Scheme ID (921) | variable | (length, value) pair |
| KR Flags (922) | 1 byte | (bitmap: 1 = contains sender KRF<br>2 = contains receiver KRF) |
| Validation Flag (923) | 1 byte | (1 = keyed MAC<br>2 = Direct KRSP validation<br>3 = IVCS signature<br>4 = pre-shared secret) |
| Validation Data (924) | variable | (length, value) pair |
| Opaque KRF (925) | variable | (length, value) pair |
| Integrity Flag (926) | 1 byte | (1 = HMAC) |
| Integrity Data (927) | variable | (length, value) pair |

In all cases, integrity is verified by the integrity data 927, which may be a MAC of the KRF 925 based on a shared secret 710. (MACs and signatures described herein may be generated on fields other than just the KRF 925, but obviously cannot include the field of the KRB in which the MAC or signature itself is placed.) The shared secret 710 and corresponding ID 706 would be created from hashes of the session key K from the first (verified) KRB exchange, regardless of which method is used for KRB validation.

A validation flag 923 of "1" indicates that the KRB 920 is not strongly validated, and a simple hash of the current session key should be used for the integrity MAC. This case could be used if multiple KRBs 920 are attached, and only one of them needs to be strongly validated, or if a weak validation based on knowledge of the session key is considered sufficient. In this case the Validation Data field would be null. As the session key is supposedly known only to the cryptographic framework, a malicious application could not modify the key recovery information without causing the MAC to fail, this does perform a weak form of validation.

A validation flag 923 of "2" indicates that the receiver framework 204 has a KRSP 212 for the following KRB 920, and that this KRSP should be used for explicit validation of the KRB. In this case, the validation data field 924 will contain a proposed validation ID 706 that would be used by the sender 102 in the pre-shared secret mode of validation on future sessions. The receiver would have the KRSP 212 validate the KRB 920, and if it validates correctly, would store the validation ID 706 and shared secret 710 (derived from a hash of the current session key) for future sessions.

A validation flag 923 of "3" indicates that an IVCS signature validation should be performed. In this case, the validation data 924 will contain an IVCS certificate, a signature on the KRB 920 based on this certified public key, and a proposed validation ID 706. The receiver could verify the signature on the KRB 920 (i.e., on the KRF 925), and if correct, store the shared secret 710 and validation ID 706 as in the previous case.

A validation flag 923 of "4" indicates that the sender 102 has previously sent a validated KRB 920, and wishes to reuse the stored pre-shared secret 710 corresponding to the validation ID 706. In this case the validation data 924 will contain the validation ID 706 to be used. The receiver 104 would retrieve the pre-shared secret 710 and use it to verify the integrity data 927.

Figure 10:
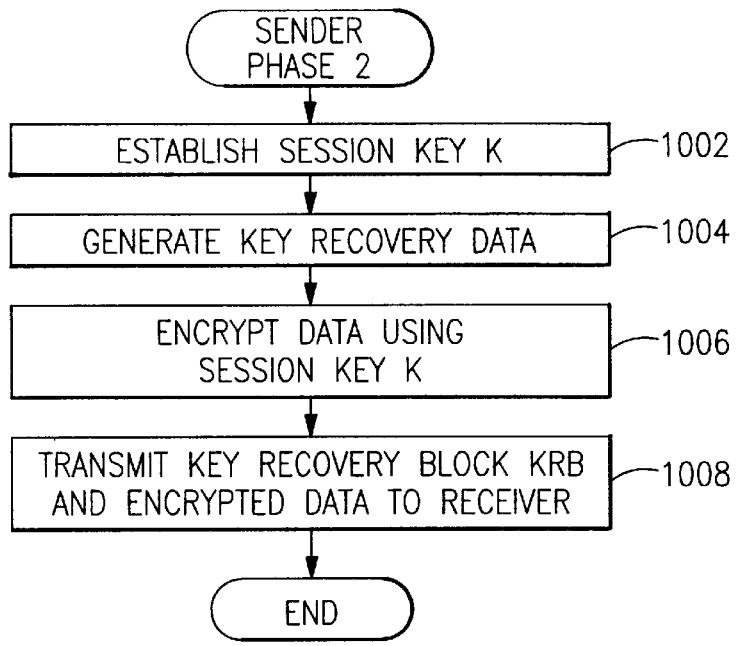
FIG. 10 shows the phase 2 procedure followed by the sender.

FIG. 10 shows the procedure followed by the sender 102 during phase 2. The sender 102 first establishes a session key K for encrypted communication with the receiver 104 (step 1002); this session key is unrelated to the session key used to communicate with the KRVS. Any one of a number of procedures could be used to establish the session K; the particular procedure forms no part of the present invention. Thus, the sender 102 could randomly generate a session key K and communicate it to the receiver 104 by encrypting it with a public key of the receiver to form a key exchange block (KEB) which is sent to the receiver. Alternatively, the sender 102 and receiver 104 could jointly establish a session key, such as by using the Diffie-Hellman key agreement procedure referred to above.

Figure 6:
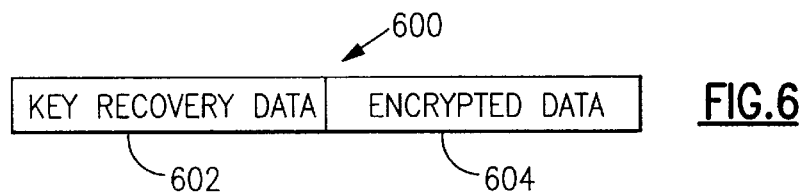
FIG. 6 shows a typical message format.

Next, the sender generates key recovery data 602 (FIG. 6) comprising one or more key recovery blocks (KRBs) (step 1004). The validation data that the sender 102 would include in each KRB would depend on the value of the validation flag 923, as indicated above. Thus, with particular reference to the present invention, if the validation flag 923 is 3, the sender 102 generates a digital signature on the KRF 925 using its private signature key and includes the signature along with a copy of the certificate 1600 and a proposed validation ID 706 in the validation data field 924. The sender 104 encrypts the desired data under the session key K to generated encrypted data 604 (step 1006), which is sent along with the recovery data 602 in a message block 600 to the receiver 104.

Figure 11:
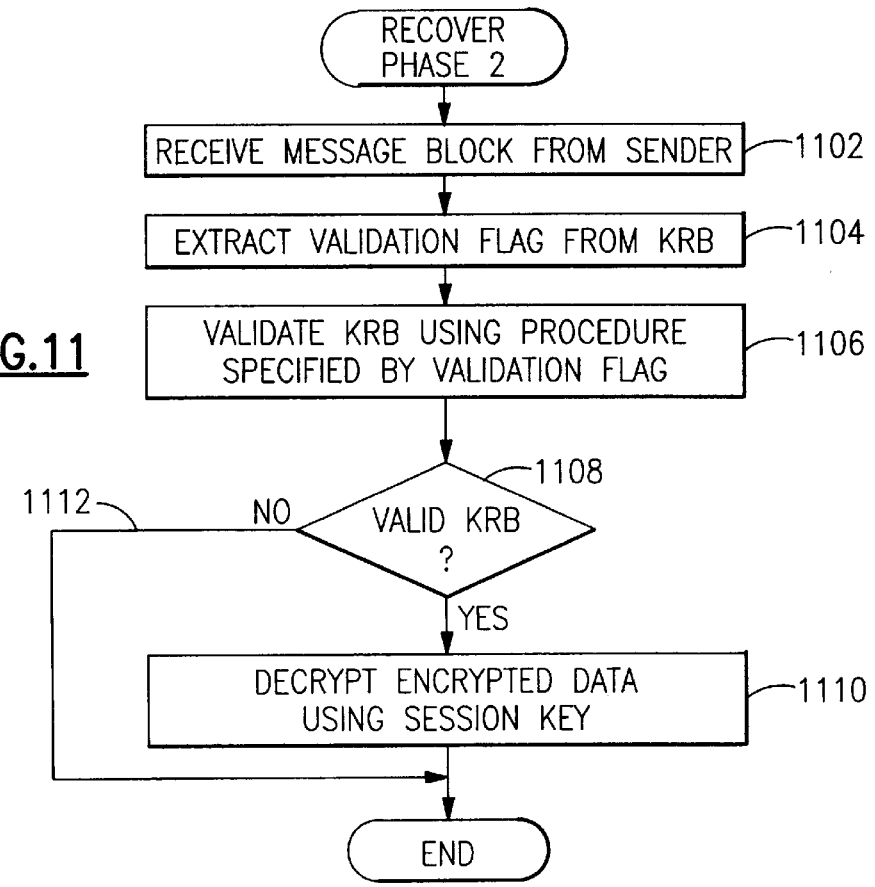
FIG. 11 shows the phase 2 procedure followed by the receiver.

FIG. 11 shows the procedure followed by the receiver 104 during phase 2. The procedure begins when the receiver 104 receives a message block 600 containing key recovery data 602 (composed of one or more KRBs 920) and encrypted data 604 (step 1102). For each KRB 920 in the key recovery data 602, the receiver 104 extracts the validation flag 923 from the KRB (step 1104) and performs the validation procedure indicated by the flag (step 1106); steps 1104 and 1106 are performed iteratively if there is more than one KRB. If the receiver 104 finds each KRB to be valid (1108), then it decrypts the encrypted data 604 using the session key K (step 1110). Otherwise, the receiver 104 terminates the procedure without decrypting the data 604 (step 1112).

FIGS. 12–15 show the validation procedures that are alternatively invoked at step 1106 for a given KRB 920, depending on the value of the validation flag 923 in that KRB.

Figure 12:
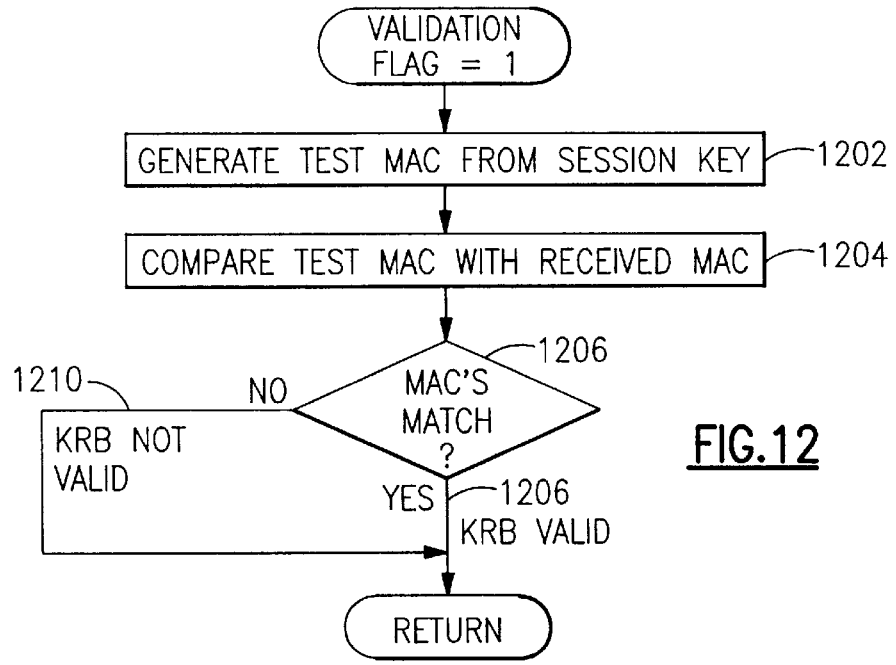
FIG. 12 shows the validation procedure followed by the receiver for a validation flag of 1.

FIG. 12 shows the procedure for a validation flag 923 of 1. The receiver 104 generates a test MAC from the session key K, using the procedure specified by the integrity flag 926 (step 1202), and compares it with the MAC contained in the integrity field 927 (step 1204) of the KRB 920. If the two MACs match (step 1206), then the KRB 920 is declared valid for the purpose of allowing decryption to proceed, even though the KRB has not actually been tested (step 1208); otherwise, the KRB is declared invalid (step 1210).

Figure 13:
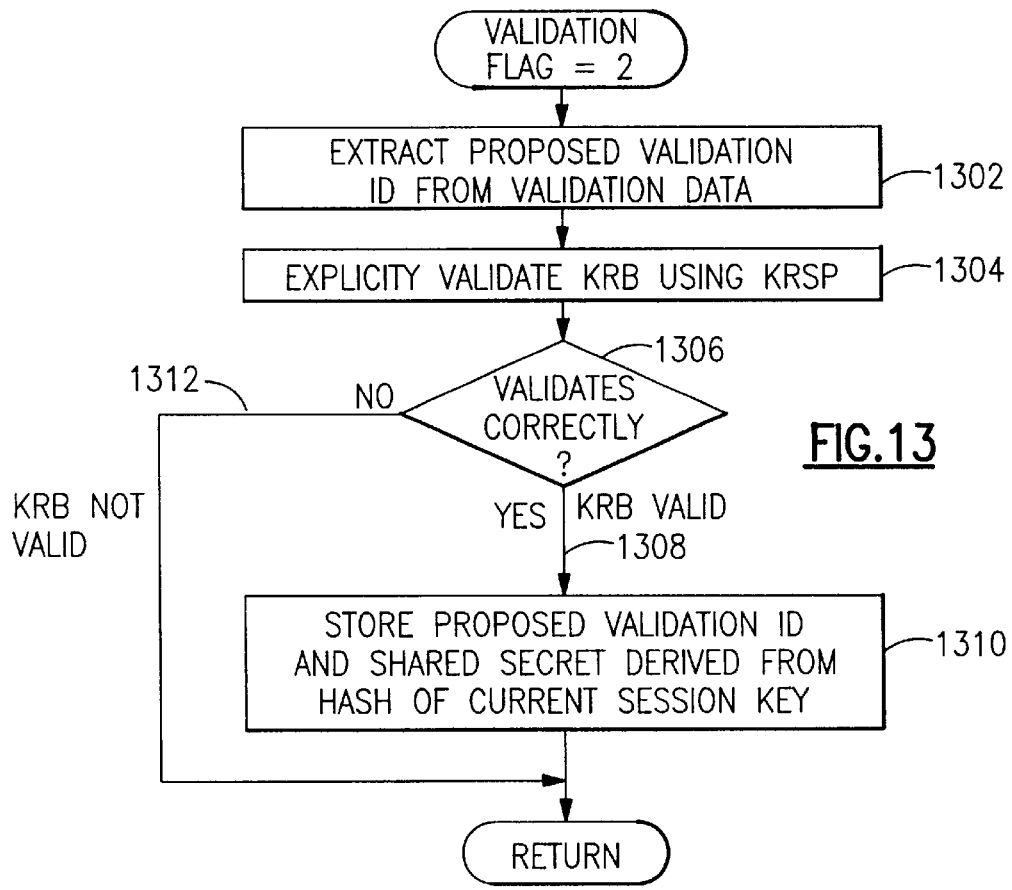
FIG. 13 shows the validation procedure followed by the receiver for a validation flag of 2.

FIG. 13 shows the validation procedure for a validation flag 923 of 2. The receiver 104 extracts the proposed validation ID 706 from the validation data field 924 (step 1302) and explicitly validates the KRF 924 using its KRSP 212 (step 1304). The explicit validation procedure used depends on the particular key recovery protocol; thus, if KRF 924 is created by encrypting the session key (or "shares" of the session key) under public keys of the key recovery agents and concatenating the encryption results, KRSP 212 would repeat this procedure and compare the result with the received KRF. If the KRF 924 validates correctly (step 1306), the KRB 920 is declared valid (step 1308), and the proposed validation ID 706 and a shared secret 710 derived from a hash of the session key K are stored for use in validating subsequent KRBs (step 1310). Otherwise, the KRB 920 is declared invalid (step 1312).

Figure 14:
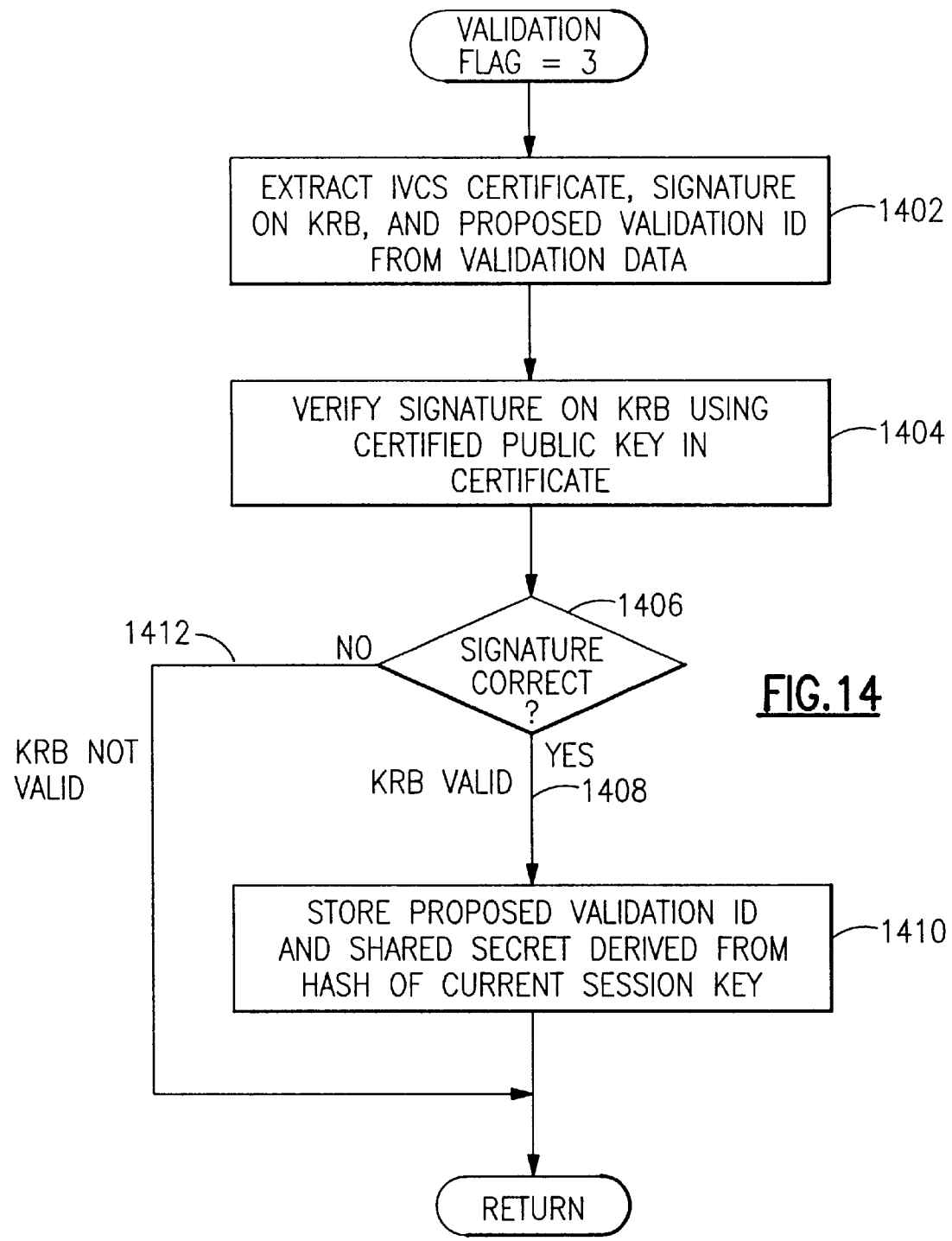
FIG. 14 shows the validation procedure followed by the receiver for a validation flag of 3.

FIG. 14 shows the validation procedure for a validation flag 923 of 3. The receiver 104 extracts the ICVS certificate, the sender's signature on the KRF 925, and the proposed validation ID 706 from the validation data field 924 (step 1402). The receiver 104 then verifies the signature on the KRB 920 using the certified public key in the certificate (step 1304). If the receiver 104 verifies the signature as being a valid signature (step 1406), it declares the KRB 920 valid (step 1408) and stores the proposed validation ID 706 and a shared secret 710 derived from a hash of the session key K for use in validating subsequent KRBs (step 1410). Otherwise, it declares the KRB 920 invalid (step 1412).

Figure 15:
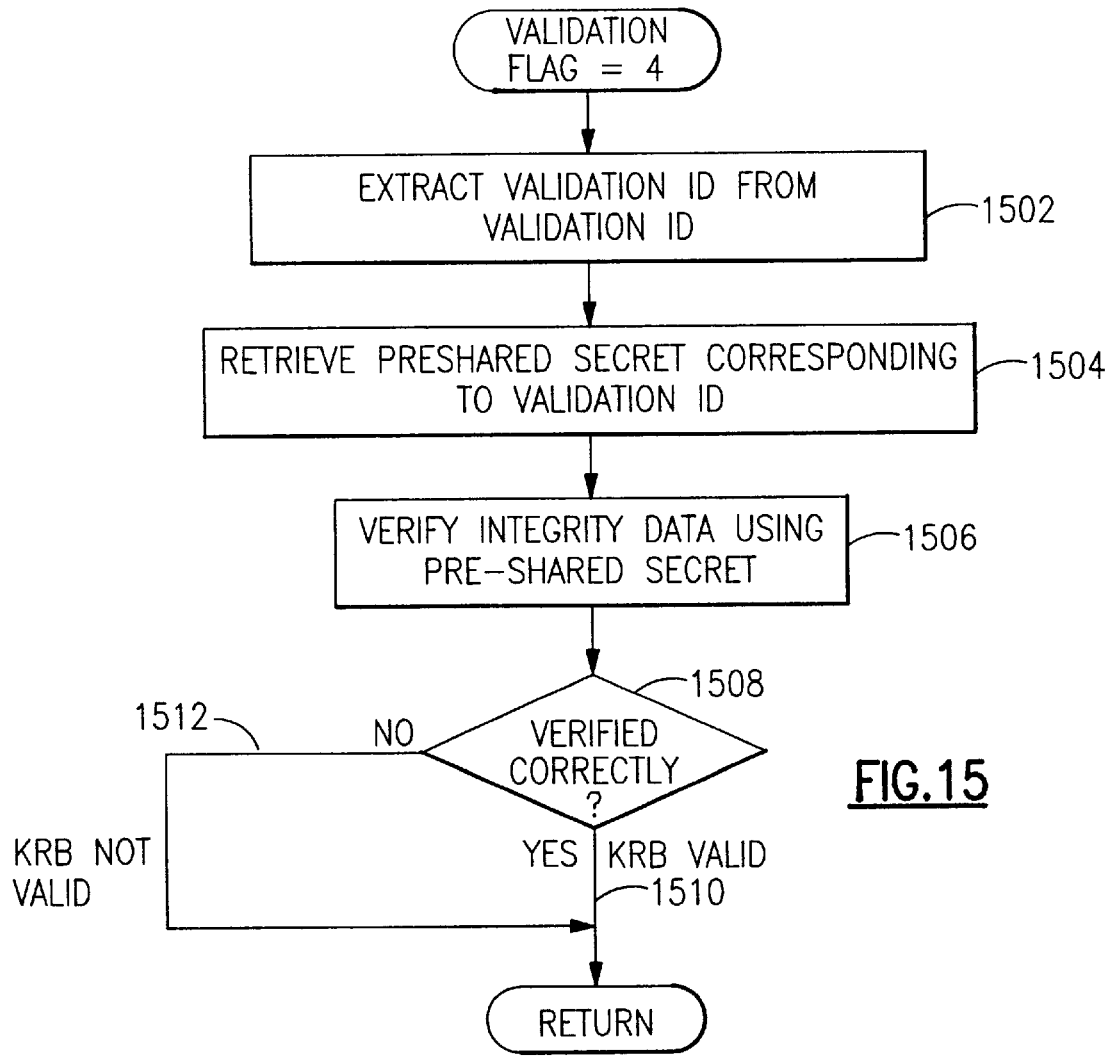
FIG. 15 shows the validation procedure followed by the receiver for a validation flag of 4.

FIG. 15 shows the validation procedure for a validation flag 923 of 4. The receiver 104 extracts the validation ID 706 from the validation data field 924 (step 1502) and retrieves the shared secret 710 corresponding to the extracted validation ID (step 1504). The receiver 104 then verifies the integrity data 927 by computing a MAC on the KRF 925, using the MAC procedure indicated by the integrity flag 926, and comparing the result with the integrity data (step 1506). If the two results are the same (step 1508), the receiver 104 declares the KRB 920 valid (step 1510); otherwise, the KRB 920 is declared invalid (step 1512).

Several alternative modes of operation are possible. Thus, the sender 102 could always use IVCS for validation of every KRB 920. This would not require that the receiver 104 have any KRSP 212 and would not require the receiver have saved any prior validation IDs 706 or values. As a first alternative, the sender 102 could use IVCS for the first communication with a given receiver 104, with both parties saving the shared secret 710. For all subsequent communication, the shared secret 710 would be used in the validation MAC as evidence of correctness. This would make the subsequent validations much faster, as public key calculations would be avoided, but would require that the sender 102 and receiver 104 save the first validation secret. As a second alternative, if the sender 102 and receiver 104 share a common KRSP 212, they could use direct KRSP validation of the first KRB 920, and then use the established shared secret 710 in the MAC for all subsequent sessions. Still other alternatives are possible.

While a particular embodiment has been shown and described, various modifications will be apparent to those skilled in the art.

What is claimed is:

1. In a communications system in which a first party transmits encrypted data along with recovery information to a second party who decrypts the encrypted data using a decryption key, said system having one or more key recovery agents for enabling recovery of said decryption key using said recovery information, a method of demonstrating to said second party the ability of said first party to correctly generate said recovery information, comprising the steps of:

having said first party generate a first key recovery block as a test block containing recovery information for a first decryption key and transmit said first key recovery block to an independent certification authority;

having said independent certification authority validate said recovery information and, upon determining that said recovery information is correctly generated, generate a certificate certifying a public verification key corresponding to a private signature key of said first party;

having said first party generate a second key recovery block containing recovery information for a second decryption key used by said second party to decrypt encrypted data received from said first party; and having said first party transmit said second key recovery block to said second party along with a digital signature generated on said second key recovery block using said private signature key to allow said second party to verify the ability of said first party to correctly generate the recovery information in said second key recovery block by validating said digital signature using said certificate.

2. The method of claim 1 in which said first and second decryption keys are the same as said first and second encryption keys.

3. The method of claim 1 in which said first party generates a key pair comprising said private signature key and said public verification key and transmits said public verification key to said independent certification authority.

4. The method of claim 1 in which said first party receives said certificate from said independent certification authority and transmits said certificate to said second party.

5. The method of claim 1 in which said second party verifies said digital signature using said certificate and decrypts said encrypted data received from said first party only if said digital signature is verified as being a valid digital signature.

6. In a communications system in which a first party transmits encrypted data along with recovery information to a second party who decrypts the encrypted data using a decryption key, said system having one or more key recovery agents for enabling recovery of said decryption key using said recovery information, apparatus for demonstrating to said second party the ability of said first party to correctly generate said recovery information, said apparatus comprising:

means associated with said first party for generating a first key recovery block as a test block containing recovery information for a first decryption key and for transmitting said first key recovery block to an independent certification authority;

means associated with said independent certification authority for validating said recovery information and, upon determining that said recovery information is correctly generated, for generating a certificate certifying a public verification key corresponding to a private signature key of said first party;

means associated with said first party for generating a second key recovery block containing recovery information for a second decryption key used by said second party to decrypt encrypted data received from said first party; and means associated with said first party for transmitting said second key recovery block to said second party along with a digital signature generated on said second key recovery block using said private signature key to allow said second party to verify the ability of said first party to correctly generate the recovery information in said second key recovery block by validating said digital signature using said certificate.

7. The apparatus of claim 6 in which said first and second decryption keys are the same as said first and second encryption keys.

8. The apparatus of claim 6 in which said first party generates a key pair comprising said private signature key and said public verification key and transmits said public verification key to said independent certification authority.

9. The apparatus of claim 6 in which said first party receives said certificate from said independent certification authority and transmits said certificate to said second party.

10. The apparatus of claim 6 in which said second party verifies said digital signature using said certificate and decrypts said encrypted data received from said first party only if said digital signature is verified as being a valid digital signature.

11. In a communications system in which a first party transmits encrypted data along with recovery information to a second party who decrypts the encrypted data using a decryption key, said system having one or more key recovery agents for enabling recovery of said decryption key using said recovery information, a method of demonstrating to said second party the ability of said first party to correctly generate said recovery information, wherein said first party performs the steps of:

transmitting a first key recovery block as a test block containing recovery information for a first decryption key to an independent certification authority;

receiving a certificate from said independent certification authority certifying a public verification key corresponding to a private signature key upon validation of said recovery information by said independent certification authority;

generating a second key recovery block containing recovery information for a second decryption key used by said second part to decrypt encrypted data received from said first party; and transmitting said second key recovery block to said second party along with a digital signature generated on said second key recovery block using said private signature key to allow said second party to verify the ability of said first party to correctly generate the recovery information in said second key recovery block by validating said digital signature using said certificate.

12. The method of claim 11 in which said first and second decryption keys are the same as said first and second encryption keys.

13. The method of claim 11 in which said first party generates a key pair comprising said private signature key and said public verification key and transmits said public verification key to said independent certification authority.

14. The method of claim 11 in which said first party receives said certificate from said independent certification authority and transmits said certificate to said second party.

15. In a communications system in which a first party transmits encrypted data along with recovery information to a second party who decrypts the encrypted data using a decryption key, said system having one or more key recovery agents for enabling recovery of said decryption key using said recovery information, apparatus for demonstrating to said second party the ability of said first party to correctly generate said recovery information, said apparatus being associated with said first party and comprising:

means for transmitting a first key recovery block as a test block containing recovery information for a first decryption key to an independent certification authority;

means for receiving a certificate from said independent certification authority certifying a public verification key corresponding to a private signature key upon validation of said recovery information by said independent certification authority;

means generating a second key recovery block containing recovery information for a second decryption key used by said second part to decrypt encrypted data received from said first party; and means for transmitting said second key recovery block to said second party along with a digital signature generated on said second key recovery block using said private signature key to allow said second party to verify the ability of said first party to correctly generate the recovery information in said second key recovery block by validating said digital signature using said certificate.

16. The apparatus of claim 15 in which said first and second decryption keys are the same as said first and second encryption keys.

17. The apparatus of claim 15 in which said first party generates a key pair comprising said private signature key and said public verification key and transmits said public verification key to said independent certification authority.

18. The apparatus of claim 15 in which said first party receives said certificate from said independent certification authority and transmits said certificate to said second party.

19. A program storage device readable by a machine, tangibly embodying a program of instructions executable by the machine to perform method steps for demonstrating to a second party the ability of said first party to correctly generate said recovery information in a communications system in which said first party transmits encrypted data along with recovery information to said second party who decrypts the encrypted data using a decryption key, said system having one or more key recovery agents for enabling recovery of said decryption key using said recovery information, said method steps being performed by said first party and comprising:

transmitting a first key recovery block as a test block containing recovery information for a first decryption key to an independent certification authority;

receiving a certificate from said independent certification authority certifying a public verification key corresponding to a private signature key upon validation of said recovery information by said independent certification authority;

generating a second key recovery block containing recovery information for a second decryption key used by said second part to decrypt encrypted data received from said first party; and transmitting said second key recovery block to said second party along with a digital signature generated on said second key recovery block using said private signature key to allow said second party to verify the ability of said first party to correctly generate the recovery information in said second key recovery block by validating said digital signature using said certificate.

20. The program storage device of claim 19 in which said first and second decryption keys are the same as said first and second encryption keys.

21. The program storage device of claim 19 in which said first party generates a key pair comprising said private signature key and said public verification key and transmits said public verification key to said independent certification authority.

22. The program storage device of claim 19 in which said first party receives said certificate from said independent certification authority and transmits said certificate to said second party.

* * * * *